Oct. 4, 1932.   J. J. BAUMLER   1,880,659
OIL RETAINER FOR STEERING GEARS
Filed Oct. 19, 1931
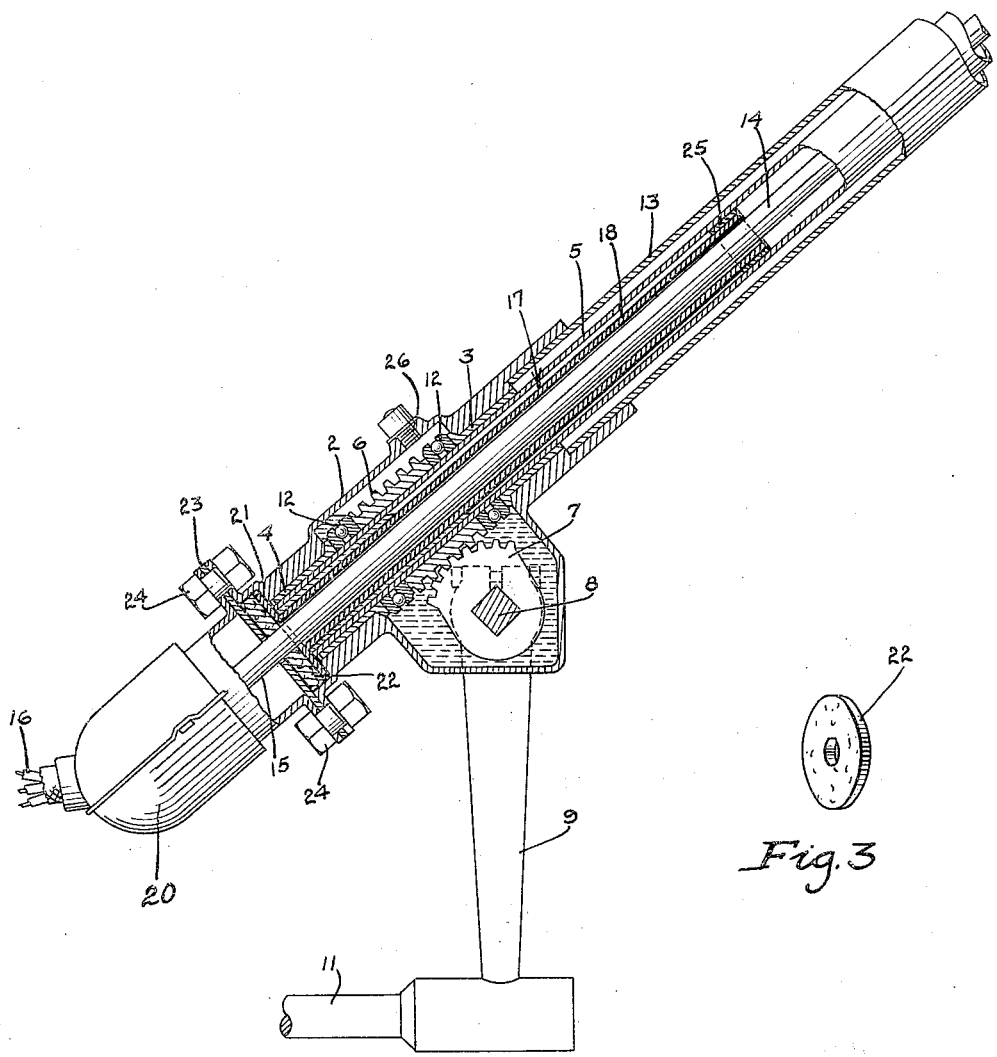
Fig. 3
Fig. 1
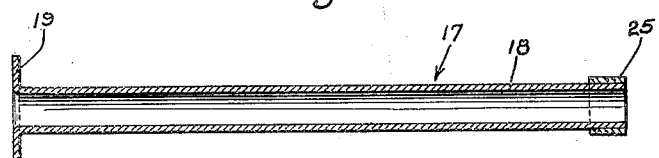
Fig. 2
INVENTOR
JACOB J. BAUMLER
BY
ATTORNEYS Patented Oct. 4, 1932

1,880,659

UNITED STATES PATENT OFFICE

JACOB J. BAUMLER, OF MINNEAPOLIS, MINNESOTA

OIL RETAINER FOR STEERING GEARS

Application filed October 19, 1931. Serial No. 569,825.

This invention relates to an improved oil retainer adapted for use in connection with a steering gear to prevent leakage of oil therefrom.

An object of the invention is to provide an oil retainer of simple and inexpensive construction which may readily be attached to a conventional steering gear without necessitating any change in the construction of said gear.

A further object is to provide an oil retainer comprising a tubular body adapted to be inserted into the lower end of a hollow steering gear shaft, and provided with a flanged head adapted to be secured to the lower end of the steering gear housing in leak-proof relation, and the upper end of the tubular body portion of the retainer being disposed above the normal high level of the oil in said housing so as to prevent the escape of oil from said housing through said tubular member.

A further object is to provide in combination with a steering gear comprising a housing having a hollow steering shaft mounted in suitable bearings therein, and having a relatively smaller tube disposed within the steering shaft and protruding from the lower end of the shaft and housing, an oil retainer comprising a tubular body portion adapted to be inserted into the lower end of the hollow steering shaft and over the lower end of the relatively smaller rod supported therein, said retainer having a flanged head adapted to be secured to the lower end of the housing in leak-proof relation, the upper end of said member being disposed above the oil level in said housing and having means thereon for sealing the joint between said member and the wall of the steering shaft so as to prevent the escape of oil therethrough, and means being provided at the lower end of said member for guidingly supporting the protruding end of said smaller tube.

In the operation of certain conventional types and makes of automobile steering gears, difficulty has heretofore been experienced in preventing a portion of the oil within the housing thereof, to leak therefrom at the point where the usual light wire switch tube protrudes from the housing, which, if not noted, may result in the ruination of the upper steering shaft bearing within the housing. It is now common practice to provide at the lower end of such a steering gear housing, a suitable gasket having a central aperture through which the light wire tube projects. This tube provides a support for the usual wires leading from the lighting circuits to the light control switch mounted upon the steering post or wheel. The lower end of this tube usually protrudes from the lower end of the housing and provides a support for the usual distributor box, from which the electric light wires lead to the various lights of the automobile. The construction of the steering gear housing is such that the oil or lubricant which works through the lower bearing supporting the steering shaft, comes in direct contact with the gasket provided at the lower end of the housing, and if the aperture in this gasket through which the light wire tube passes, does not snugly fit the wall of the tube, oil will leak from the housing through this aperture and will run down the tube to the distributor, often causing short circuits and other trouble. It is the purpose of this invention to provide a simple and inexpensive oil retainer which may be readily applied to steering gears of the above described type, which will positively prevent the leakage of oil from the housing at the point where the light wire tube projects therefrom.

Other objects of the invention will appear from the following description and accompanying drawing and will be pointed out in the annexed claims.

In the accompanying drawing, there has been disclosed a structure designed to carry out the various objects of the invention, but it is to be understood that the invention is not confined to the exact features shown as various changes may be made within the scope of the claims which follow.

In the drawing:

Figure 1 is a cross-sectional view illustrating a conventional type of automobile steering gear and showing the invention applied thereto;

Figure 2 is a cross-sectional view showing the oil retainer removed from the housing; and Figure 3 is a perspective view of the gasket used for sealing the joint between the head of the oil retainer and the lower end of the housing so as to prevent the escape of oil therefrom.

In the selected embodiment of the invention here shown, for purposes of disclosure, there is illustrated in Figure 1, a conventional steering gear comprising a housing 2 provided with upper and lower bearings 3 and 4, respectively, adapted to support the usual hollow steering shaft 5. A worm gear 6 is suitably secured to the steering shaft 5 between the bearings 3 and 4, and meshes with a gear segment 7 secured to a shaft 8 supported in suitable bearings, not shown, provided in the lower portion of the housing 2. The usual steering arm 9 is shown secured to the shaft 8 and is adapted for connection with the usual drag link 11 in the usual manner. Suitable thrust bearings 12 are shown provided at opposite ends of the worm gear 6 to take up the thrust of the shaft imparted to the worm wheel 6 through the arm 9.

The usual steering column 13 is shown suitably secured to the upper end of the housing 2 and extends upwardly therefrom in the usual manner to the instrument board of the vehicle. The steering shaft 5 is rotatably mounted within the steering column. A relatively smaller tube 14 is shown axially mounted within the steering shaft 5 and has its lower end portion 15 protruding from the housing through a gasket secured thereto, as shown in Figure 1. The usual light switch casing 20 is shown secured to the lower end of the housing 2 and conceals the protruding end of the light wire tube 15. It is to be noted that the primary object of the tube 15 is to provide means for supporting and conducting the light wires 16 from the switch casing 20 through the steering shaft 5 to the switch levers usually mounted upon the steering wheel.

An important feature of this invention resides in the means provided for preventing leakage of oil from the steering gear housing at the point where the light wire tube 15 projects from the lower end of the housing. To prevent such oil leakage, I insert into the lower end of the steering shaft 5, an oil retainer, indicated generally by the numeral 17. This oil retainer comprises a tubular body portion 18 adapted to be inserted into the lower end of the steering shaft 5 and over the lower end portion of the light wire tube 15, as best shown in Figure 1. The oil retainer is provided at one end with a flanged head 19 adapted to be seated against a face 21 provided at the lower end of the housing. A suitable gasket 22, preferably of leather, is seated against the flanged head 19 of the oil retainer and is retained thereon by means of a clamping plate 23, adapted to be detachably secured to the housing by suitable bolts 24. The gasket 22 has a central aperture adapted to receive the tube 15 and to provide a guide for the lower end thereof. The clamping plate 23 is also apertured to receive the tube 15, as shown.

The body portion 18 of the oil retainer is made sufficiently long to extend upwardly into the steering shaft 5 so that its upper end will be disposed above the normal oil level in the gear housing 2, as clearly shown in Figure 1. A suitable packing 25 such, for example, as leather, may be secured to the upper end of the body portion 18 of the oil retainer to seal the joint between the upper end thereof and the wall of the steering shaft 5. The packing 25 is so secured to the upper end of the oil retainer that should it become necessary to remove the oil retainer from the housing, the packing 25 will be removed therewith.

Conventional steering gears used in certain makes of automobiles are provided at their lower ends with a gasket similar to the gasket 22, and means, such as the plate 23 for securing said gasket against the face of the housing. The usual aperture provided in the gasket is so made as to snugly fit the light wire tube 15 for the purpose of preventing leakage of oil through the gasket around the tube. In time, however, the aperture in the gasket becomes worn so that oil will leak from the housing 2 around the light wire tube, which may cause short circuits in the switch casing 20.

By inserting the novel oil retainer herein disclosed into the lower end of the steering shaft 5 and securing it to the housing, as hereinbefore described, oil leakage through the aperture in the gasket 22 around the light wire tube 15 is positively prevented, even though the aperture in the gasket becomes worn to the extent that the tube has a slight lateral play therein. This will readily be understood by reference to Figure 1, wherein it will be noted that any oil which creeps through the lower bearing 4 of the housing will not come in direct contact with the light wire tube 15, but will be received in the annular space provided around the tubular body portion 18 of the oil retainer and the bore of the steering shaft 5, it being understood, of course, that the flanged head 19 of the oil retainer is secured to the housing in leakproof relation.

Thus, it will be seen that when this novel oil retainer is installed in a gear housing, little care need be taken on the part of the attendant in filling the housing with a lubricant, as all he needs to do is to introduce the oil through the filler opening 26 until the housing is filled to overflowing through the filler opening. The packing 25 at the upper end of the retainer will prevent any excess oil from flowing over the top of the tubular body portion 18, as will readily be understood.

The oil retainer is secured in proper position within the steering shaft 5 by means of the gasket 22 and clamping plate 23, as hereinbefore stated. The simple and inexpensive construction of the oil retainer is such that it may be manufactured at a very small cost and it is so designed that it may be applied to an ordinary steering gear without changing or altering any of the parts thereof. All that is necessary is to remove the clamping plate and gasket corresponding to the parts 22 and 23, after which the retainer may be inserted into the steering shaft and secured in place therein by means of the gasket 22 and clamping plate 23, as herein described.

In the drawing, I have shown the oil retainer in its preferred form, but it is to be understood that various changes may be made in the construction thereof without departing from the scope of the invention. The main feature of the invention, as hereinbefore stated, resides in the provision of an oil retainer comprising a tubular body portion adapted to be inserted into the lower end of a hollow steering gear shaft and secured to the lower portion of the housing in leak-proof relation, said body portion extending into the shaft so that the upper end thereof will be positioned above the oil level in the housing.

I claim as my invention:

1. The combination with a steering gear comprising a casing having bearings therein, a hollow steering shaft mounted in said bearings, a closure for the lower end of one of said bearings concealing the end of said shaft, an oil chamber within the casing, and a rod mounted within said hollow shaft and protruding from one end of the housing, of a tubular member adapted to be inserted into the lower end of said hollow shaft and fitting over the rod supported therein, said tubular member having an enlarged head at one end adapted to be seated against said housing, means for securing said head to the housing in leak-proof relation, and the upper end of said member being disposed above the normal oil level in said housing, to prevent oil leakage from the housing at the point where said rod protrudes therefrom.

2. The combination with a steering gear comprising a casing having bearings therein, a hollow shaft having one end supported in said bearings, a closure for the lower end of one of said bearings concealing the end of said shaft, and a tube disposed within said hollow shaft and projecting from one end thereof, of an oil retainer comprising a tubular body portion adapted to be inserted into the lower end of said hollow shaft and fitting over said tube, said body portion having an annular flange at one end adapted to be fitted between said housing and the closure and secured thereto in leak-proof relation, the other end of said member being disposed above the normal oil level in said housing, and means at the upper end of said tubular body portion adapted to seal the joint between it and the wall of said hollow shaft, whereby oil introduced into said housing cannot escape therefrom.

3. The combination with a steering gear comprising a casing having bearings therein, a hollow shaft having one end supported in said bearings, a closure for the lower end of one of said bearings concealing the end of said shaft, and a tube disposed within said hollow shaft and projecting from one end thereof, of an oil retainer comprising a tubular body portion adapted to be inserted into the lower end of said hollow shaft and fitting over said tube, said body portion having an annular flange at one end adapted to be fitted between said housing and the closure, a suitable gasket seated against said annular flange to provide a leak-proof joint, said gasket having an aperture thereon adapted to receive and support the protruding end of said tube, and the opposite end of the tubular body portion of said member being disposed above the normal oil level in said housing, and a packing secured to the upper end of said tubular member adapted to seal the joint between it and the wall of the hollow shaft, whereby oil introduced into said housing cannot escape therefrom.

4. The combination with a steering gear comprising a casing having bearings therein, a hollow shaft having one end supported in said bearings, a closure for the lower end of one of said bearings concealing the end of the shaft, and a tube disposed within said hollow shaft and projecting from one end thereof, of an oil retainer comprising a tubular body portion adapted to be inserted into the lower end of said hollow shaft and fitting over said tube, said body portion having an annular flange at one end adapted to be fitted between said housing and the closure and secured thereto in leak-proof relation, the other end of said member extending upwardly into said hollow shaft and having its upper end disposed above the normal oil level in said chamber, to prevent oil leakage from the housing at the point where said tube protrudes therefrom.

In witness whereof, I have hereunto set my hand this 16th day of October 1931.

JACOB J. BAUMLER.